(12) United States Patent
Bowers

(10) Patent No.: US 6,196,609 B1
(45) Date of Patent: Mar. 6, 2001

(54) TAILGATE LOWERING MECHANISM

(76) Inventor: Jerald A. Bowers, 46613 Barbara Dr., Macomb Township, MI (US) 48044

( * ) Notice: Subject to any disclaimer, the term of this patent is extended or adjusted under 35 U.S.C. 154(b) by 0 days.

(21) Appl. No.: 09/413,316

(22) Filed: Oct. 6, 1999

(51) Int. Cl.$^7$ .................................................. B62D 33/03
(52) U.S. Cl. ................................................................ 296/57.1
(58) Field of Search ............................... 296/57.1, 50, 61

(56) References Cited

U.S. PATENT DOCUMENTS

| | | |
|---|---|---|
| 514,076 | 2/1894 | Hotz . |
| 709,193 | 9/1902 | Barson . |
| 2,260,504 | 10/1941 | Barrett . |
| 3,306,655 | 2/1967 | Voehringer . |
| 4,348,045 | 9/1982 | Hori et al. . |
| 4,691,956 | 9/1987 | Hodge . |
| 5,271,652 | 12/1993 | Watanabe et al. . |
| 5,449,212 | 9/1995 | Seifert . |
| 5,954,383 | * 9/1999 | Beck et al. ............................ 296/50 |

FOREIGN PATENT DOCUMENTS

| | | | |
|---|---|---|---|
| 309693 | * 4/1929 | (GB) | ...................................... 296/61 |
| 457500 | * 11/1936 | (GB) | .................................... 296/57.1 |
| 510464 | * 8/1939 | (GB) | ...................................... 296/61 |
| 638263 | * 6/1950 | (GB) | ...................................... 296/61 |
| 7407-939 | * 6/1974 | (NL) | ...................................... 296/50 |

* cited by examiner

Primary Examiner—Dennis H. Pedder
Assistant Examiner—Patricia Engle
(74) Attorney, Agent, or Firm—Harness, Dickey & Pierce, P.L.C.

(57) ABSTRACT

A lowering mechanism for a tailgate of a vehicle comprises a spring housing, a spring, and a flexible cable. The spring housing is preferably mounted under a lip of the truck box. The spring extends coaxially between a proximal and distal end of the tube. The flexible cable has a first end attached to the tailgate and a second end attached to the coil spring adjacent the distal end of the tube. The cable extends coaxially through the spring and the tube. The spring retards movement of the tailgate to a generally horizontal open position.

20 Claims, 5 Drawing Sheets

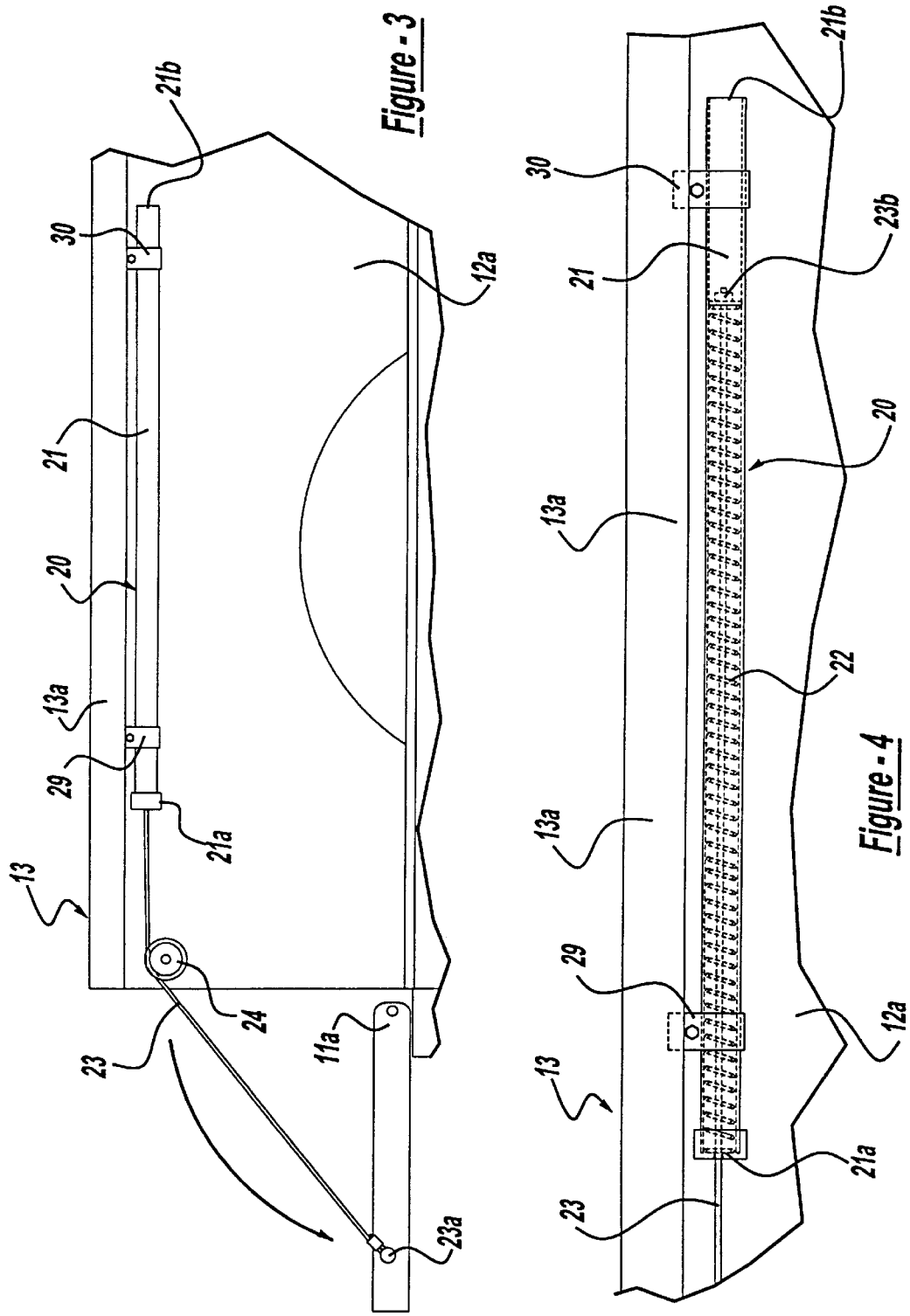

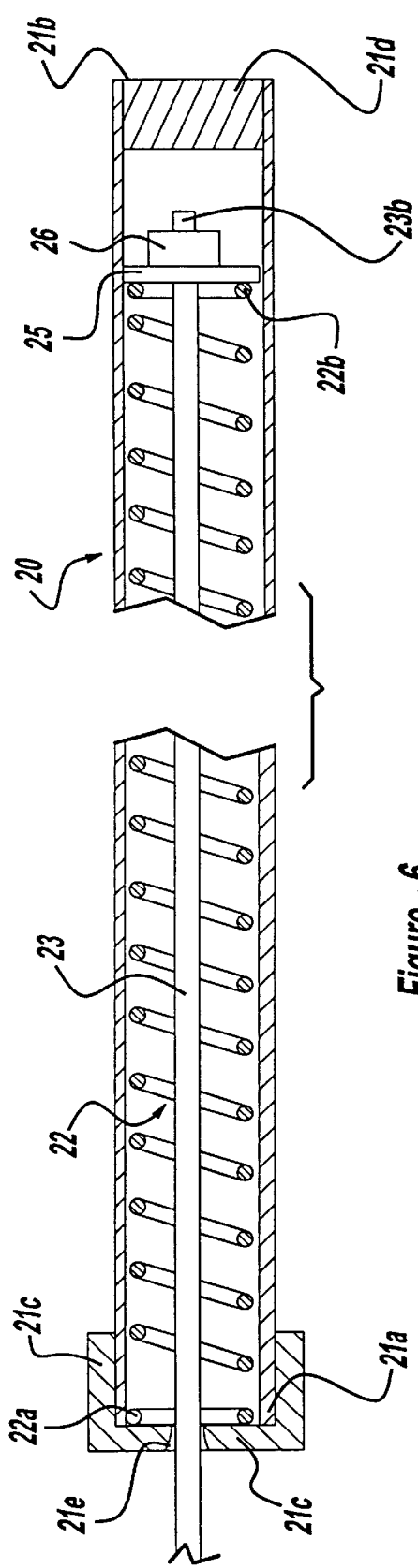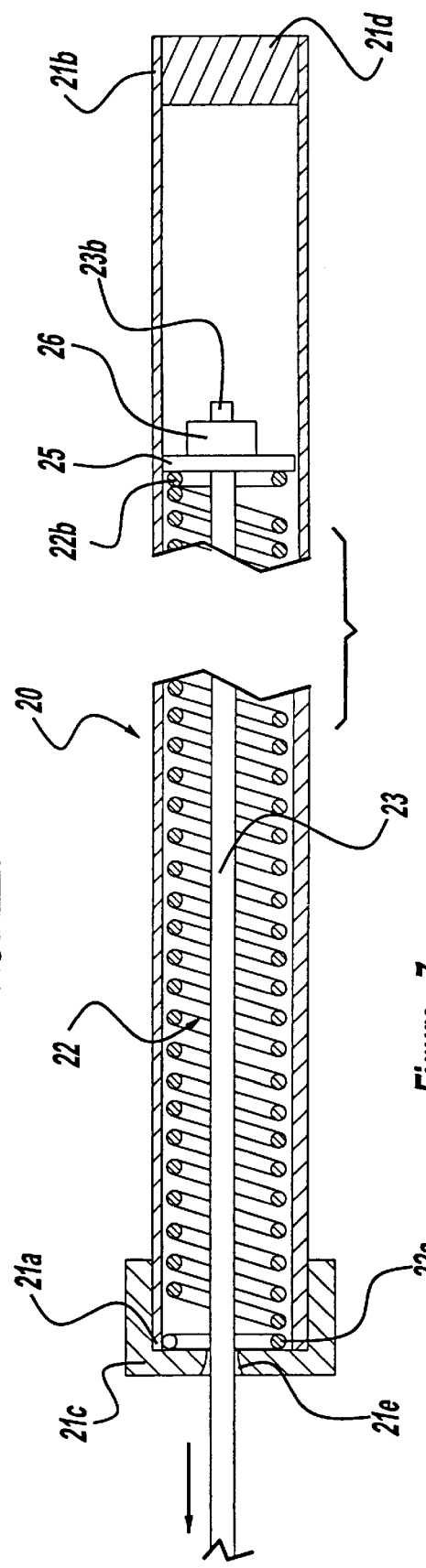

TAILGATE LOWERING MECHANISM

BACKGROUND OF THE INVENTION

The present invention relates to a lowering mechanism for a tailgate of a vehicle. More particularly, the invention relates to a mechanism for moving a tailgate between a generally vertical closed position and a generally horizontal open position at a controlled rate.

Vehicles, such as pickup trucks, typically have a tailgate for selectively enclosing a truck box. Conventionally, the tailgate is pivotally mounted at a lower end to the sides defining the truck box. The tailgate is movable between a generally vertical position for enclosing the truck box and a generally horizontal position for defining a side opening to the truck box. Upon releasing a latch when the tailgate is in its generally vertical closed position, the user can move the tailgate to the generally horizontal open position. Heretofore, movement between the vertical and horizontal position has been manually controlled, whereby the user must secure the tailgate during a lowering operation. Otherwise, the relatively heavy weight of the tailgate would cause the tailgate to forcefully and rapidly move from the closed position to the open position. Because of the weight of the tailgate, such uncontrolled movement poses a risk of injury to the user as well as others who may be in the tailgate's lowering range.

SUMMARY OF THE INVENTION

The present invention provides a lowering, mechanism for a tailgate of a vehicle. The tailgate is hinged at its bottom edge to a side wall of a truck box for movement between a generally vertical raised position and a generally horizontal lowered position. The lowering mechanism includes a spring loaded apparatus to dampen movement of the tailgate to the generally horizontal open position, thereby protecting a user or others in relative proximity from possible injury resulting from the downward force of the tailgate. Also, the spring loaded apparatus reduces the force normally needed to move the tailgate to the generally vertical position, thereby helping the user close the tailgate. The tailgate lowering mechanism can be retrofit for virtually any vehicle tailgate.

According to the invention, the tailgate lowering mechanism generally comprises a spring housing, tube, a coil spring, and a flexible cable. The spring housing tube is preferably mounted under a lip of the track box to avoid congestion of the truck bed. The coil spring extends coaxially between a proximal and distal end of the tube. The flexible cable has a first end attached to the tailgate and a second end attached to an end of the coil spring adjacent the distal end of the tube. Movement of the tailgate from a generally vertical closed position to a generally horizontal open position is retarded by the spring, which is compressed by the weight of the tailgate, as transferred by the cable, as the tailgate is lowered. Also, movement of the tailgate to the generally vertical closed position from the generally horizontal open position is assisted by the coil spring, which urges the tailgate to the upright position, through the cable, as the spring, returns to its rest position.

In a variation of the invention, the tailgate lowering mechanism further comprises a pulley mounted under the truck box lip and near the proximal end of the tube. The cable is fed over the pulley to facilitate movement of the first end of the cable attached to the tailgate. Also, the tailgate lowering mechanism may include a spring compressing, plate coaxially movable inside of the tube. The plate is preferably a washer having, an outer diameter smaller than the inner diameter of the tube. For this embodiment, the second end of the cable is threaded for fastening the second end of the cable to the plate by a nut, and disposing the plate between the end of the coil and the nut.

According, to another embodiment of the invention, the tailgate lowering mechanism generally includes a spring housing tube, a coil spring, and a flexible cable. The spring housing tube is mounted under a lip of the truck box. The coil spiing is disposed coaxially within the tube adjacent a distal end thereof. The flexible cable has a first end attached to the tailgate and a second end attached to an end of the coil spring, adjacent the proximal end of the tube. The cable extends coaxially through the tube and is attached to the proximal end of the coil spring. The movement of the tailgate from a generally vertical closed position to a generally horizontal open position is retarded by the spring, which is expanded by the weight of the tailgate, as transferred by the cable, as the tailgate is lowered. Further, movement of the tailgate to the generally vertical closed position from the generally horizontal open position is assisted by the expanded coil spring, which urges the tailgate to the upright position, through the cable, as the spring returns to its compressed rest position.

BRIEF DESCRIPTION OF THE DRAWINGS

FIG. 3 illustrates a partial side view of the tailgate lowering mechanism of FIG. 2, with the tailgate in the generally horizontal open position;

FIG. 4 illustrates a side sectional view of the tailgate lowering mechanism mounted under a lip of a truck box of the vehicle of FIGS. 1–3;

FIG. 6 illustrates a partial side sectional view of the spring housing of FIG. 2;

FIG. 7 illustrates a partial side sectional view of the spring housing of FIG. 3;

DETAILED DESCRIPTION OF THE PREFERRED EMBODIMENT

Figure 1:
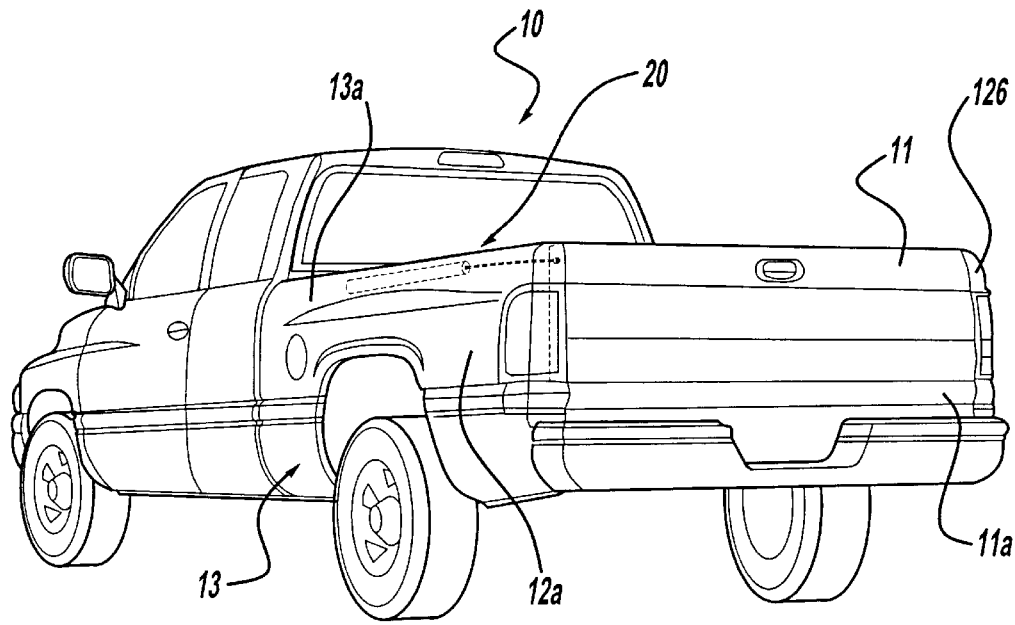
FIG. 1 illustrates a rear perspective view of a vehicle including a tailgate in the generally vertical closed position and a tailgate lowering mechanism according to the invention shown in phantom.
Figure 2:
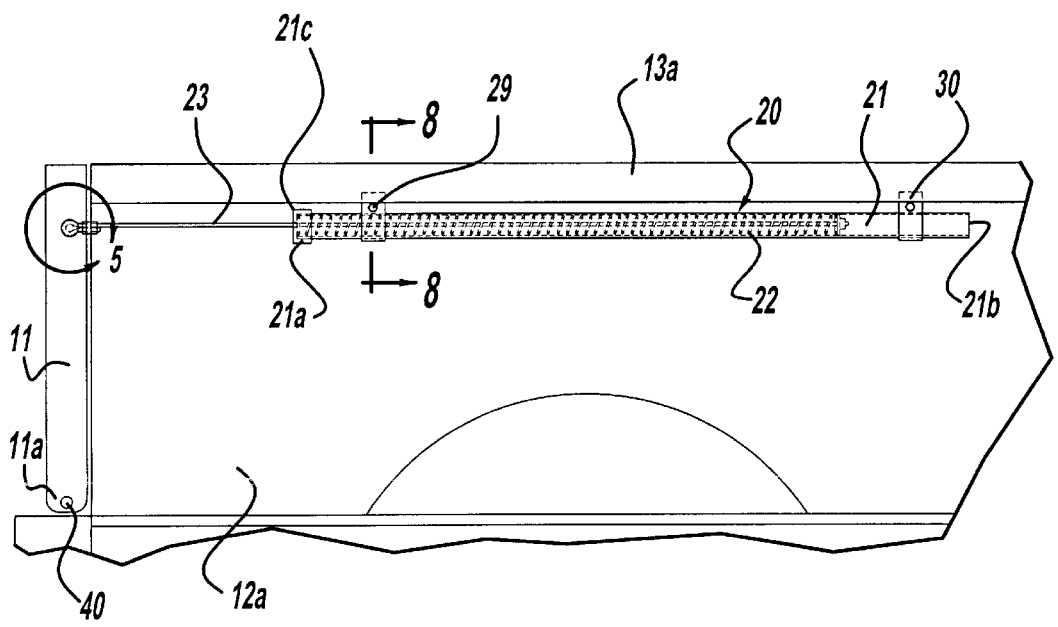
FIG. 2 illustrates a partial side view of the vehicle of FIG. 1 including the tailgate lowering, mechanism according to an embodiment of the present invention, with the tailgate in the generally vertical closed position.

With reference to the drawings, and to FIG. 1 in particular, a vehicle 10 includes a tailgate lowering mechanism 20 for assisting movement of a tailgate 11 between a generally vertical position and a generally horizontal position. As shown in FIGS. 1–3, the tailgate 11 of a vehicle 10 is hinged through pivot axles 40 at its bottom edge 11a to side walls 12a, 12b of a truck box 13 for movement between a generally vertical closed position as shown in FIG. 2 and a generally horizontal open position as shown in FIG. 3. The tailgate lowering mechanism 20 connects a lip 13a of the truck box 13 to the tailgate 11.

The lowering, mechanism 20 includes a spring housing tube 21, a coil spring, 22 disposed coaxially within the tube 21, and a flexible cable 23 extending coaxially through the spring 22 and tube 21. The spring housing tube 21 is mounted under the lip 13a of the truck box 13 and includes end caps 21c, 21d at each end. The end cap 21c, at a proximal end 21a of tube 21, includes an aperture 21e to allow cable 23 to pass therethrough. The end cap 21c abuts leading convolution 22a of spring, 22 to allow compression of spring, 22 during use.

Figure 8:
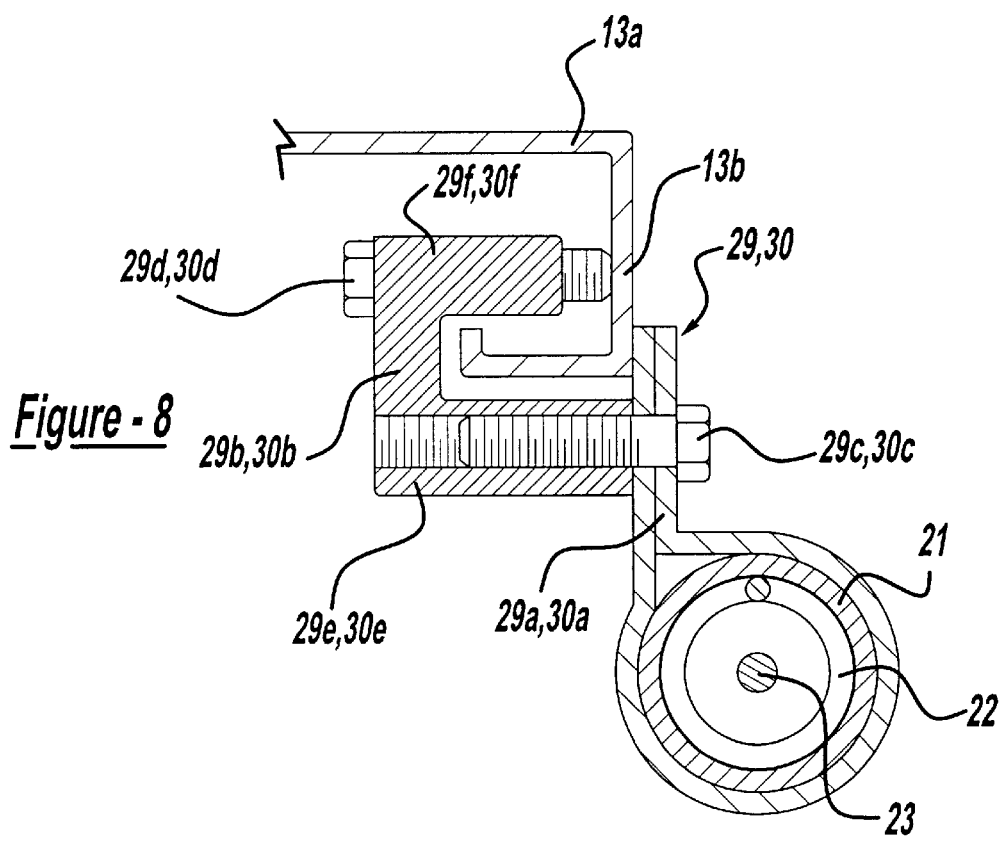
FIG. 8 illustrates a partial sectional view taken along line 8—8 of FIG. 2.

As shown best in FIGS. 4 and 8, the spring housing tube 21 is mounted by a pair of mounting brackets 29 and 30 to the truck lip 13a. As shown in FIG. 8, for each bracket 29, 30, the spring housing tube 21 is hung by a support portion 29a, 30a, which has an upper portion fastened by a bolt 29c, 30c to a sectional U-shaped hook portion 29b, 30b. A threaded lower portion 29e, 30e of each hook portion 29b, 30b receives each bolt 29c and 30c. Also, a upper threaded portion 29f, 30f of each hook portion 29b, 30b receives each mounting bolt 29d, 30d by disposing a wall 13b of track box lip 13a between the ends of mounting bolt 29d, 30d and the support portion 29a, 30a, the mounting brackets 29, 30 are respectively fixed to a truck lip 13a by tightening bolts 29c, 30c and bolts 29d, 30d.

Figure 5:
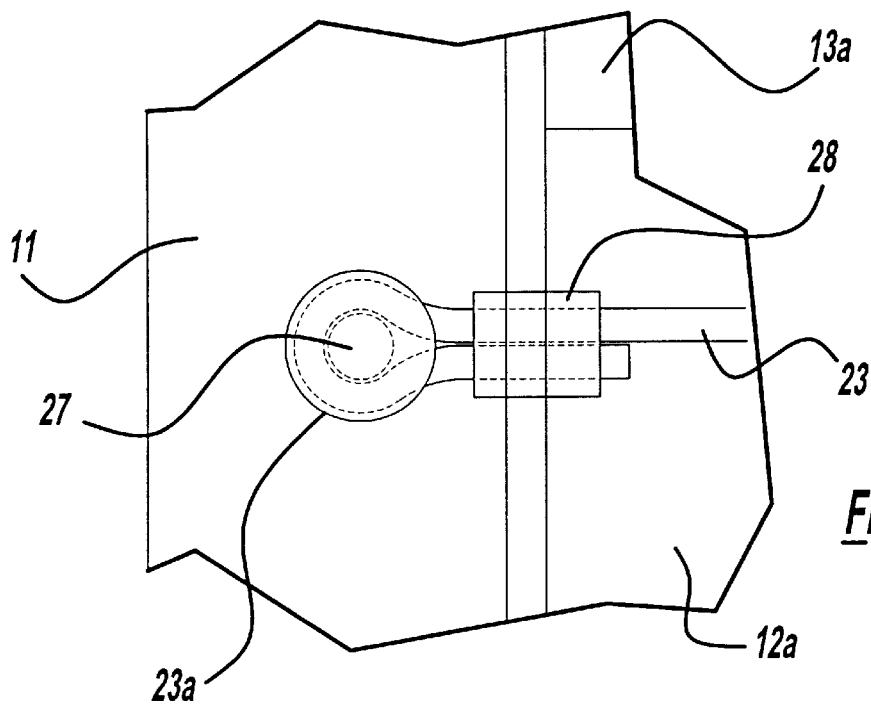
FIG. 5 illustrates a side fragmental view taken from detail 5 of FIG. 2.

The cable 23 is connected at opposite ends to the tailgate 11 and the spring 22. The cable 23 is preferably braided wire sheathed in plastic. As shown in FIG. 5, a mountling post 27 is attached to the tailgate 11 for securing a first end 23a of the cable 23 to the tailgate 11. The end 23a of the cable 23 is preferably looped around the mounting, post 27 and fastened to the post 27 by a crimp 28.

The spring 22 is preferably a compression-type coil spring but may be any other spring or dampening mechanism, such as a pneumatic or viscous dampener. As shown in FIG. 4, the spring 22 extends coaxially between proximal end 21a and distal end 21b of the tube 21. The end cap 21c provides a stop for the spring 22, which is compressed against the end cap 21 during use. The first end 23a of the cable 23 is attached to the tailgate 11 at post 27 and a second end 23b of the cable 23 is attached to the coil spring 22 adjacent the distal end 21b of a tube 21. More specifically, the cable is attached to distal convolution 22b of the spring 22. The cable 23 extends coaxially through the coil spring 22 and a tube 21.

Preferably as shown in FIG. 6, the second end 23b of the cable 23 is attached to the coil spring 22 through a washer 25 and a nut 26. The washer 25 has an outer diameter less than the inner diameter of the tube 21, abuts the distal convolution 22b of the spring 23, and is coaxially movable inside of the tube 21. The second end 23b of a cable 23 is threaded to receive the nut 26. The washer 25 is compressed between the distal convolution 22b of the spring 22 and the nut 26.

When the tailgate 11 is closed, it is disposed in the generally vertical raised position shown in FIG. 2. In this position, the spring 22 is preferably not compressed, but remains in its rest position as shown in FIG. 6. On the other hand, when the tailgate 11 is opened, it is disposed in the generally horizontal lowered position shown in FIG. 3. In this position, the spring 21 is compressed as the flexible cable 23 is pulled in the direction of the arrow shown in FIG. 7.

As shown in FIG. 3, a variation of the lowering mechanism 20 includes a pulley 24 mounted under a truck box lip 13a and near a proximal end 21a of a tube 21. The cable 23 is reeved through the pulley 24. The pulley 26 aligns the cable 23 with the aperture 21e in the end cap 21c of tube 21, whereby wear on the cable 23 is prevented.

In use, the tailgate 11 moves to the generally horizontal open position as the weight of the tailgate acts against the spring 22. Because the strength of the spring, 22 counterbalances the weight of the tailgate 11, the tailgate 11 opens slowly. Also, when the tailgate 11 is moved to its closed position, the tailgate is more easily raised through the reversionary power of the compressed spring, 22 against the weigth of a tailgate 11.

Figure 9:
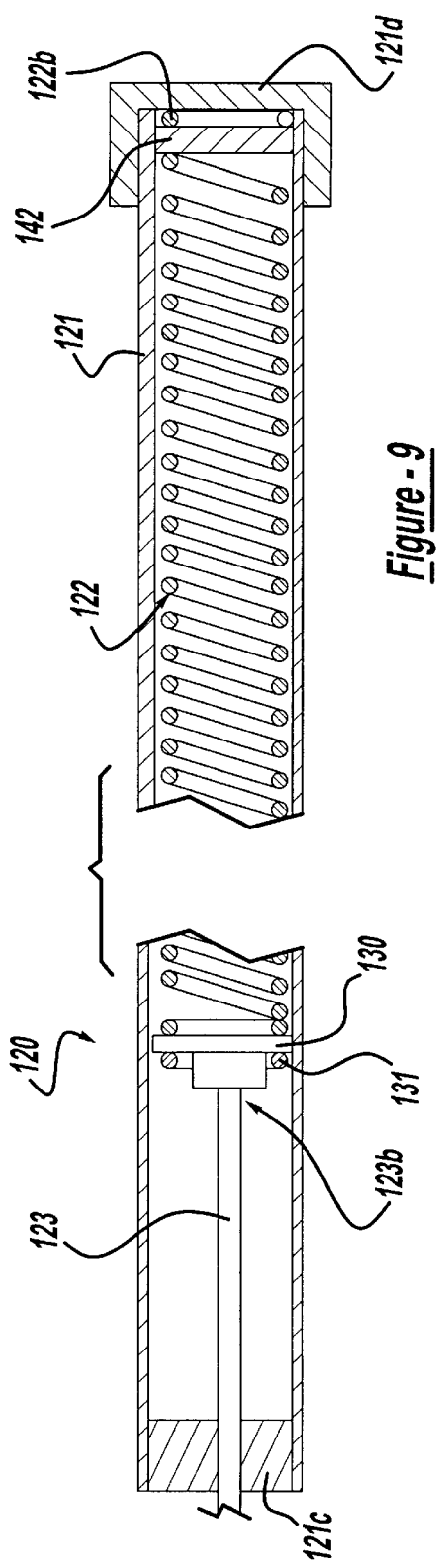
FIG. 9 illustrates a partial side sectional view of a tailgate lowering mechanism according to another embodiment of the invention, with the spring in a compressed rest position.
Figure 10:
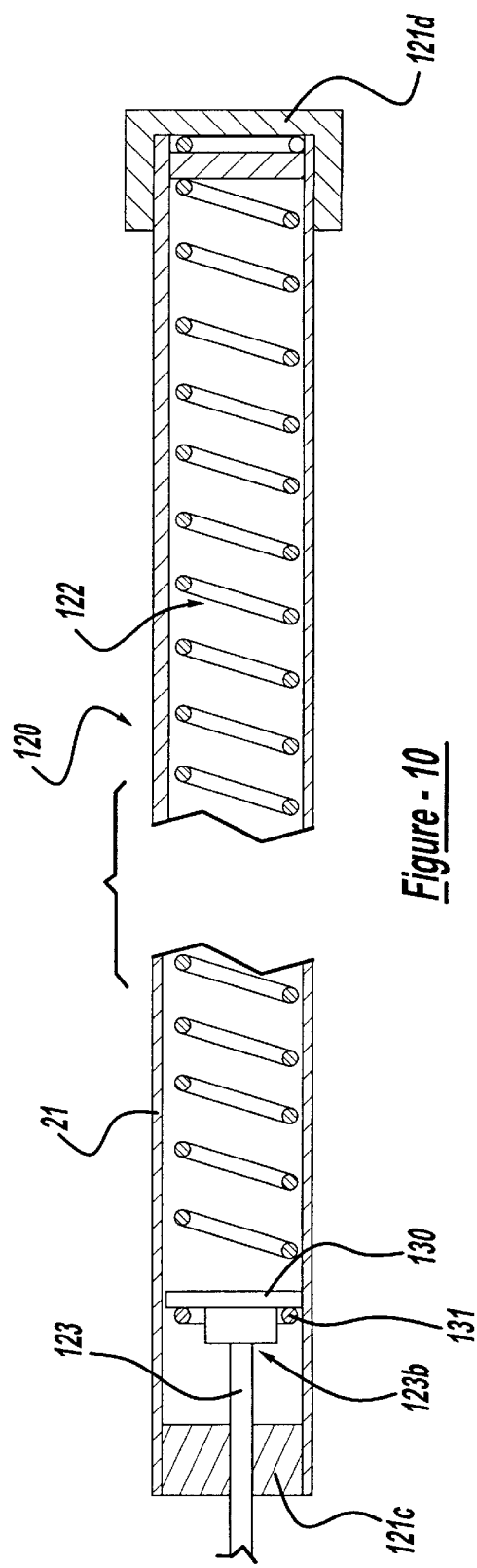
FIG. 10 illustrates a partial side sectional view of the tailgate lowering mechanism of FIG. 9, with the spring expanded.

According to a second preferred embodiment of a lowering mechanism 120, a spring 122 can be expanded, as opposed to compressed, from its rest position to control opening of the tailgate 11 as shown in FIGS. 9 and 10. For this embodiment, a distal convolution 122b of the spring 122 is fixed relative an end cap 121d, preferably by a block 142, within a spring housing tube 121. A second end cap 121c covers an opposite end of the spring housing tube 120. A leading convolution 131 of the spring 122 is fixed to a second end 123b of a flexible cable 123, preferably through a washer 130 interleaved behind the leading convolution 122a of the spring 122. The nut 126 fixes the second end 123b of the cable to the washer 130. When the tailgate 11 is in the generally vertical closed position, the spring 122 remains in its rest position of FIG. 9. When the tailgate 11 is moved to the generally horizontal open position as shown in FIG. 10, the spring 122 is expanded by the movement of the flexible cable 123. During this movement of the tailgate 11, the weight of a tailgate 11 acts against the compressed spring 122, which retards the opening movement. Therefore, a tailgate 11 opens slowly. Also, when moving the tailgate 11 to the closed position, the reversionary power of the spring 122 acts against the weight of a tailgate 11 to case this movement.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A lowering mechanism for a tailgate of a vehicle, the tailgate being hinged at its bottom edge for movement between a generally vertical closed position and a generally horizontal open position relative to a floor of the vehicle, said lowering mechanism comprising:

a spring housing mounted to the vehicle;

a spring disposed between a proximal and distal end of the housing;

a flexible cable having a first end attached to the tailgate and a second end attached to the spring within the housing, wherein said spring retards movement of the tailgate to the generally horizontal open position; and a mounting bracket having a first portion attached to the lowering mechanism and a second portion connected with and adjustable to said first portion, the mounting bracket mounting the lowering mechanism to a wall of the vehicle.

2. The lowering mechanism of claim 1, further comprising a plate abutting the spring and being coaxially movable inside of the spring housing, the second end of the cable being fastened to the plate for transferring movement of the cable to the spring.

3. The lowering mechanism of claim 2, wherein the second end of the flexible cable is threaded, the plate includes an aperture therethrough for receiving the threaded end of the cable, and a nut is received on the threaded end of the cable for disposing the plate between the nut and a convolution of the spring.

4. The lowering mechanism of claim 1, wherein the flexible cable is attached to a distal convolution of the spring for compressing the spring when the tailgate is moved to a generally horizontal closed position.

5. The lowering mechanism of claim 1, wherein the flexible cable is connected to a leading convolution of the spring for expanding the spring when the tailgate is moved to the generally horizontal open position.

6. The lowering mechanism of claim 1, further comprising a pulley mounted adjacent the proximal end of the housing, wherein the cable is fed through the pulley.

7. The lowering mechanism of claim 1, wherein the wall of the vehicle includes a lip disposed generally vertically and the first portion of the mounting bracket is disposed essentially on one side of the lip and the second portion of the mounting bracket is disposed essentially on an opposite side of the lip.

8. A tailgate lowering mechanism, the tailgate defining a side opening of a truck box and being pivotally mounted for movement between a generally vertical closed position and a generally horizontal open position relative to a floor of the truck box, said lowering mechanism comprising:

a spring house mounted on a wall of the truck box;

a spring disposed coaxially within the housing;

a cable having a first end attached to the tailgate and a second end attached to the spring within the housing, the cable moving through an aperture in the housing when the tailgate is moved between the generally vertical closed position and the generally horizontal open position, the spring retarding movement of the tailgate to the generally horizontal open position; and a mounting bracket having a first portion attached to the lowering mechanism and a second portion connected with and adjustable to said first portion, the mounting bracket mounting the lowering mechanism to the lip.

9. The lowering mechanism of claim 8, further comprising a plate abutting the spring and being coaxially movable inside of the housing, the second end of the cable being fastened to the plate for transferring movement of the cable to the spring.

10. The lowering mechanism of claim 9, wherein the second end of the flexible cable is threaded, the plate includes an aperture therethrough for receiving the threaded end of the cable, and a nut is received on the threaded end of the cable for disposing the plate between the nut and a convolution of the spring.

11. The lowering mechanism of claim 8, wherein the flexible cable is attached to a distal convolution of the spring for compressing the spring when the tailgate is moved to a generally horizontal closed position.

12. The lowering mechanism of claim 8, wherein the flexible cable is connected to a leading convolution of the spring for expanding the spring when the tailgate is moved to the generally horizontal open position.

13. The lowering mechanism of claim 8, further comprising a pulley mounted adjacent the proximal end of the housing, wherein the cable is reeved through the pulley.

14. The lowering mechanism of claim 8, wherein the wall of the truck box is a lip disposed generally vertically and the first portion of the mounting bracket is disposed essentially on one side of the lip and the second portion of the mounting bracket is disposed essentially on an opposite side of the lip.

15. A lowering mechanism for a tailgate of a vehicle, the tailgate being hinged at its bottom edge to a sidewall of a truck box to move to a generally vertical closed position and a generally horizontal open position relative to a floor of the truck box, said lowering mechanism comprising:

a spring for retarding movement of the tailgate to a generally horizontal open position;

a flexible cable connecting the tailgate and the spring;

a housing at least partially mounting the spring; and a mounting bracket for attaching the housing to the truck box, the mounting bracket including a first portion supporting the housing and a second portion connected to the first portion and sandwiching a wall of the truck box therebetween, whereby the mounting bracket is secured to the truck box.

16. The lowering mechanism of claim 15, wherein the first portion is a support portion formed about the housing, and connected to the second portion through a bolt received through an aperture and threaded into the second portion.

17. The lowering mechanism of claim 15, wherein the second portion is generally U-shaped and includes a first threaded opening for receiving a first bolt connecting the first portion to the second portion and a second threaded opening for receiving a second bolt for sandwiching the wall of the truck box between the first portion and the second portion.

18. The lowering mechanism of claim 15, wherein the first portion is connected to the second portion through a first bolt and the wall is sandwiched between the first portion and the second portion by a second bolt.

19. The lowering mechanism of claim 15, wherein the wall of the truck box is a lip disposed generally vertically and the first portion is disposed essentially on one side of the lip and the second portion is disposed essentially on an opposite side of the lip.

20. The lowering mechanism of claim 15, wherein the first portion includes a loop supporting the housing and a lug receiving a first bolt, the first bolt being threaded into a first opening of the second portion, the second portion further including a second opening for threadably receiving a second bolt for sandwiching the wall between the first portion and the second portion.

* * * * *